United States Patent [19]

Marcus

[11] Patent Number: 5,481,668
[45] Date of Patent: Jan. 2, 1996

[54] SYSTEM FOR DESIGNING INFORMATION CONTROL NETWORKS FOR MODELING ALL KINDS OF PROCESSES

[75] Inventor: Michel Marcus, Vitry, France

[73] Assignee: Bull S.A., Paris, France

[21] Appl. No.: 73,070

[22] Filed: Jun. 8, 1993

[30] Foreign Application Priority Data

Jun. 9, 1992 [FR] France ................................ 92 06932

[51] Int. Cl.$^6$ ...................................................... G06F 3/14
[52] U.S. Cl. ........................ 395/161; 395/159; 395/155; 395/140
[58] Field of Search ...................................... 395/161, 159, 395/155, 160, 157, 140, 700, 650, 375

[56] References Cited

U.S. PATENT DOCUMENTS

| | | | |
|---|---|---|---|
| 4,315,315 | 2/1982 | Kossiakoff | 395/140 |
| 4,656,603 | 4/1987 | Dunn | 395/161 X |
| 4,831,525 | 5/1989 | Saito et al. | 395/700 |
| 4,901,221 | 2/1990 | Kodosky et al. | 395/159 |
| 5,237,691 | 8/1993 | Robinson et al. | 395/700 |
| 5,283,896 | 2/1994 | Temmyo et al. | 395/650 |
| 5,377,318 | 12/1994 | Wolber | 399/159 |

OTHER PUBLICATIONS

Software Practice & Experience, vol. 21, No. 8, Aug. 1991, Chichester, GB, M. Baldassari et al., "PROTOB: An Object–oriented Case Tool for Modelling and Prototyping Distributed Systems", pp. 823–844.

Journal of Parallel and Distributed Computing, vol. 9 No. 2, Jun. 1990, Duluth, Minn., USA, V. Y. Shen et al., "VERDI: A Visual Environment for Designing Distributed Systems", pp. 128–137.

Primary Examiner—Raymond J. Bayerl
Attorney, Agent, or Firm—Kerkam, Stowell, Kondracki & Clarke; Edward J. Kondracki

[57] ABSTRACT

A system for designing information control networks for modeling all kinds of processes, characterized in that the model considers the process as a set of independent procedures composed of objects represented by graphical symbols and accompanied by textual attributes and links between these objects and information which is represented in the form of graphs intended to be manipulated interactively on a graphical screen of a workstation.

22 Claims, 6 Drawing Sheets

SYSTEM FOR DESIGNING INFORMATION CONTROL NETWORKS FOR MODELING ALL KINDS OF PROCESSES

FIELD OF THE INVENTION

The present invention relates to a system for designing information control networks for modeling all kinds of processes with a view to using it in a transactional processing system between an information server and a plurality of workstations.

CROSS-REFERENCE TO RELATED APPLICATIONS

The invention disclosed and claimed herein is related to the subject matter of the following commonly-assigned patent applications, the entire disclosure of which is hereby incorporated herein by reference:

Ser. No. 08/071,766, filed concurrently herewith, by LI et al., entitled "System for Transactional Processing Between An Information Processing Server and a Plurality of Workstations".

Ser. No. 08/074,126, filed concurrently herewith, by LI et al., entitled "User Interface For Transactional Processing System."

SUMMARY OF THE INVENTION

A first object of the invention is to propose a system for designing information control networks that are simple to implement and that enables the user easily to model any processes regardless of the type of process.

This object is attained in that the system for designing information control networks for modeling all kinds of processes is characterized in that the model considers the process to be a set of independent procedures composed of objects represented by graphical symbols and accompanied by textual attributes and links between these objects and information which is represented in the form of graphs intended to be manipulated interactively on a graphical screen of a workstation.

In another feature, the objects are constituted by activities, AND-SOURCE or OR-SOURCE jumps from which at least two activities begin, or AND-WELL, OR-WELL jumps at which at least two activities end.

In another feature, the textual attributes include the name of the actor specifying an identity of the person or entity who performs the activity, the name of the activity, the name of the type or of the storage location of the information (receptacle), the mean frequency of use when there is a choice to made between a plurality of activity segments, the production period corresponding to each activity, a period representing the minimum interval that must elapse between two successive interventions of the same activity.

In another feature, the information is represented by receptacles, which may be a file, document, or message, and are connected to the activities via a connection represented by dashed arrows.

In another feature, the receptacle associated with a message is represented in the form of a diamond.

In another feature, the receptacle associated with a file is represented in the form of a parallelogram.

In another feature, the receptacle associated with a document is represented in the form of a square.

In another feature, an AND-SOURCE jump is intended to start two activities in parallel, on the condition that the activity preceding the AND-SOURCE is terminated.

In another feature, an AND-WELL jump is intended to wait until all the activities preceding the AND-WELL have been done before passing to the next activity.

In another feature, an OR-SOURCE jump is intended to start one of the two possible activities, depending on the choice made.

In another feature, an OR-WELL jump is intended to start the next activity, if any of the two previous parallel activities have been done.

In another feature, this system includes means for developing the model of the process constituted by the following functions: "draw" to draw a graph, "modify" to change the graph, and "text" to introduce the information and the textual attributes.

In another feature, this system includes means for starting a simulation of processing of a process.

In another feature, the "draw" function makes it possible to call up the following commands:

"ACTIVITY", assuring the drawing of an activity;
"AND" for drawing a graphical symbol representing an "AND", "OR" for drawing a graphical symbol representing an "OR", "ARROW" to draw the flows chaining activities and control, and the flows representing the circulation of information among the various receptacles, "DOCUMENT" to represent a receptacle of the "document" type upon entering or leaving an activity;

"FILE" to represent a receptacle of the "file" type upon entering or leaving an activity;

"MESSAGE" to represent a receptacle of the "message" type upon entering or leaving the activity;

"WRITE TEXT" to introduce the number, the name of the activities or receptacles, and the values for duration and interval of an activity or the relative frequencies in percentage in each control flow after an "OR-SOURCE" jump.

In another feature, the "MODIFY" function makes it possible to call up the following:

a "BEND" function to bend an already-drawn arrow, a "STRAIGHTEN" function for straightening an already-bent arrow, a "+ ACTIVITY" for introducing a supplementary ACTIVITY into the route of an arrow, a "+ AND" function to introduce a supplementary AND to the route of an existing arrow, a "+ OR" to introduce a supplementary OR to the route of an existing arrow, a "– ROUND" function for withdrawing an ACTIVITY, an OR, or an AND, and to reconstruct an arrow.

In another feature, the "SIMULATION" function enables the following:

by selecting the "START" command, beginning a simulation after the determination of a certain number of parameters.

In another feature, the "SIMULATION" function enables the following:

by selecting the "END" command, stopping a simulation in progress and calling up an archive.

In another feature, the "SIMULATION" function enables the following:

by selecting the "GO/STOP" command, temporarily interrupting a simulation in progress in order to display the statistics at the moment of interruption and resume at the point where it had been stopped.

In another feature, the "START" command makes it possible to fix the parameters concerning the following:

the elementary unit of time involved in the running speed of the simulation;

the frequency of entry of tokens symbolizing the progress of activities, the choice of advancing the tokens batchwise or individually.

In another feature, the "START" command enables fixing the parameters concerning the maximum number of tokens used for the simulation.

In another feature, the "GO/STOP" command makes it possible to display the time elapsed; the number of tokens that have entered; the number of tokens that have exited; the number of tokens in the procedure; the minimum time for going through the procedure.

Another object of the invention is to propose a use of the system, in a system for processing transactions between an information processing server and at least one workstation.

This object is attained in that the functions "activity", "AND", "OR", "ARROW", "FILE", "MESSAGE" and, "TEXT" make it possible to document the ORGA-ACTOR, ORGA-ROLE, ORGA-R-OFF-ACT, and JDV-PDDEF tables of a system for transactional processing between an information server and at least one workstation, between which the activities constituting the procedures are executed by the system including on the server side a scheduler module for the tasks and job associated with the activities, a dispatcher module for performing the distribution of the tasks, a signaler module for preserving a trail of timed events and receiving information from the scheduler and from a coordinator module, a message box exchanging signals on the one hand with the dispatcher module and signaler module and on the other with a module for communication with at least the workstation and a module for managing the data in the work flow, the system including on the workstation side a communication layer, a layer for management of messages corresponding to a work flow, a layer including various sets of application programming interfaces, a management services layer and a user interface layer.

DESCRIPTION OF THE DRAWINGS

Further features and advantages of the present invention will become more apparent from the ensuing description taken in conjunction with the accompanying drawings, in which.

DETAILED DESCRIPTION

Figure 7:
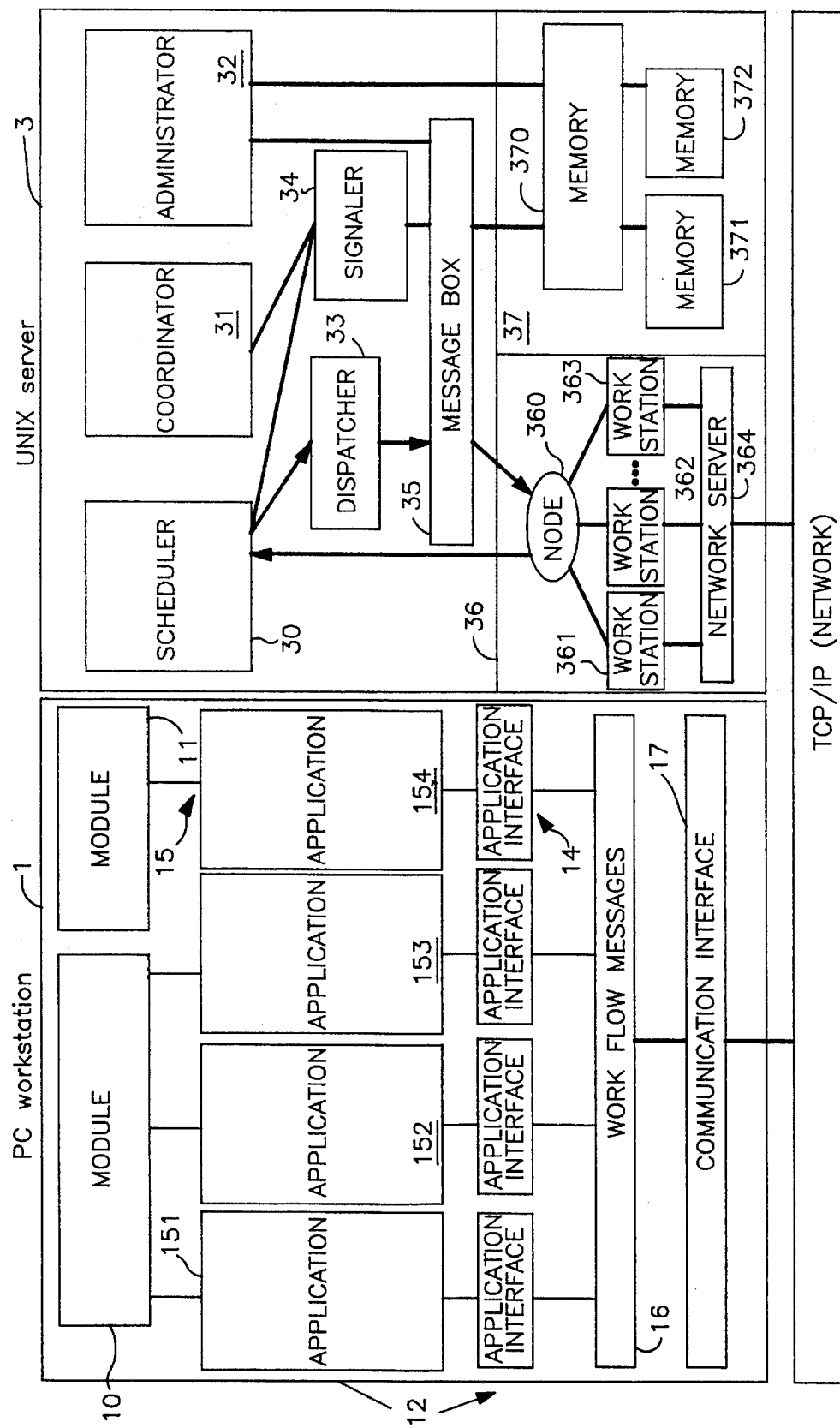
FIG. 7 shows a system for transactional processing between a server and at least one workstation, in which the system for designing control networks for modeling processes is used.

The server (3) of FIG. 7 includes a set of modules (30–37) which initializes and coordinates the activities. The term activity is understood to mean the body of a work step, or a procedure, that is, a basic work unit, which must be a sequential set of primitive actions executed by a single actor.

The activities may function by one of the following three modes: automatic, manual, and mixed.

The body of an activity constitutes the execution portion of an activity. This body includes a list of actions to be executed at the workstation. The order of these activities is not fixed and depends on data in the procedure. An activity body includes an identifier and a list of actions ($A_i$). The pair [ProcedureId, ActivityId] uniquely identifies an activity body linked with the activity (ActivityId) that belongs to the procedure whose identity is (ProcedureId). An action N can be activated by the user on the corresponding form on the screen of the workstation (1). This action can be divided into two parts: a first part $A_i$, which is a command (PreScript) to be executed when the user wishes to select an action N (for example, initialization), and a second part $Z_i$, which is the command (PostScript) to be executed when the user wishes to validate the action selected.

The actions of an activity are numbered from 0 to N. Action A0 is a particular in which the command (PreScript) for selection is automatically executed and validated prior to any other action.

A prefix PR of the activity calls up a form that furnishes the presentation and interaction phase for the activity on the screen of the station.

The structure of the data of the activity is furnished by a file whose name is preceded by the prefix ADV. The syntax of an action is constituted by a "action type" field (ActionType), a "action name" field (ActionName) and several arguments, which are job data vector (JDV) fields, represented by $J_i$, and activity data vector (ADV) fields, represented by $A_i$, and these fields are stored in the vectors (ADV, JDV) of the memory (370) of the server (3). The actions may be of the following types: executable, DLL function, DDE exchanges. The transactional processing system, aids in defining, executing, coordinating and controlling the flow of work between the organizations or work groups, being based on a description of the Office Tasks, which can be described as recurrent structured tasks called procedures, whose basic work elements are called activities and which must be executed by various individuals, called actors, in a certain sequence.

An actor consists of a unique identification of the actor (usrid) furnished by the system, an actor name (name), a first name of the actor (firstName), a unique session opening word (loginName), a password (password), and a tag (alias).

A procedure is a predefined set of work steps in accordance with a partial hierarchization of these steps. One work step is formed of a header (identification, precedence, etc.) and a body (activity) which constitutes the actual work to be done. Various steps in a procedure may be done by different persons or different groups of persons. In certain cases, several steps of a procedure may be done at the same time or in any arbitrary order. In general a procedure is a partially ordered set of steps; that is, one in which not all the steps need necessarily be executed sequentially, and loops are authorized, or a set that is entirely ordered. The procedures conventionally have attributes, such as the name and the person responsible associated with the procedure.

A script is a specification of a procedure, an activity, or an automatic portion of a manual activity.

A job is the control location for a particular execution of a procedure. In certain contexts, the job is called a transaction. The jobs have parameters, such as state, initiator, and archive.

A role consists of the designation of an actor or a group of actors that act as a base for access commands and execution commands. This actor is not necessarily a single person, and an actor may play several roles of an actor in an organization. An actor is a person, program or entity that can perform the roles to be played and can be responsible for these roles or be associated to certain extent with the activities and procedure. The attributes or access possibilities may be associated with the actors and with the roles.

A role is defined by the following: a single word (rid) identifying the role, the name of the role (name), and the description of the role. The role of the actor including the following: the identification of the actor (usrid) and the identification of the role (rid).

Other parameters or attributes and structures may be associated in order to create an organizational model intended to improve the work flow.

The scheduler 30 assures the creation of a job and the finalization work when the job is done and verifies all the predecessors of all the possible successors of a completed activity. The scheduler module dialogs with a dispatcher module dispatcher 33 and a signaler module 34 and sends the dispatcher a message that it has available in a message box 35, to indicate that a new task has been created, by causing the state "to dispatch" to appear in its message.

The dispatcher module has three main functions:

a) Assigning to a user the tasks that have been created by the scheduler.

b) Assigning to another user a task that has just been rejected.

c) Effecting the distribution and circulation of an activity among the users.

The signaler module 34 preserves a trail of timed events and signals the correct recipients at the proper moment.

Two timing utilities are also provided in the signaler module. The signaler 34 also receives the information from the coordinator 31, which attends to whatever happens in the work flow management system.

The dispatcher 33 and the signaler 34 exchange signals with the message box 35, which keeps all the asynchronous messages.

The message box 35 is constituted mainly by two data tables, one called MSG-BOX-BESK, which contains the description of the messages, and the second called MSG-BOX-BROADCAST, which is used to memorize the addressees of the messages.

This message box 35 also receives signals from the administrator 32. This administrator 32 is used in a deferred mode to model, create, test and reconcile the various entities of the basic system, the procedures, activities, roles, and actors. This initial work is done by one or more persons technically implementing the software described hereinafter that is the subject of the invention.

The modules 30–37 of the server 3 communicate through the communication system including the elements 36, 2, 17, 16 with a client module constituted by a set of modules 10–15. The server system 3 communicates through a network 2 and a network server 364 with a client system 1, including a communication interface 17 and a four-layer architecture, whose first layer is the system of messages in the work flow 16, the second layer 14 is constituted by various sets of client application program interfaces, a third management service layer 15, and a fourth layer 10, 11, which is the uppermost layer of the interface.

For further detail on the structure and function of the server system and workstation terminal, reference may be made more broadly to the related applications cited above.

The various elements, and in particular the administrator, as has been explained, serve to create a model, test it, and reconcile the various entities of the base system.

This step may involve analysis of the organizational structures, information flows, and office procedures. The "form" and "security structure" activities must be created.

The procedure scenarios are written using the formalities of the software according to the invention, which consist in creating an information control network (ICN), which will be described hereinafter.

Hence one example of an office procedure may be a simplified procedure for financial monitoring of a research project. In such a procedure, the project is sent by a candidate to the administration section of a service X which proceeds to record it and send it to a decision committee meeting. This project returns to the administrative section of the service X in the form of a hiring proposal and an as yet unsigned draft contract. These elements are received by a responsible person in the sector, then photocopied by his secretary and sent to the bookkeeping section. Next, on the one hand, a payment order from the candidate arrives, and the signature of the candidate and the amount of the charges are verified, and on the other hand, bookkeeping situations arrive that are recorded. The responsible person in the section can then exert his control and review the payment orders and send them to bookkeeping.

Based on these elements, the activities can thus be defined and classified chronologically, and for each activity the actor, the information, and the path of the information upon arrival and on being sent can be defined. One such definition is shown in appendixes 1 and 2, and the various activities are: recording the project (1), approval (2), reception and distribution (3), endorsement (4), photocopying and sending (5), receiving and sending the payment order (6), recording bookkeeping situations (7), return to the administrative section (8), checking (9), and endorsement of the payment orders (10).

Each activity is broken down into these elements; hence taking the sixth activity, "receiving and sending the payment order", as an example, the actor is the bookkeeping section; the information that has arrived is constituted by the photocopy of the file that originated in the bookkeeping mail; and the information sent is constituted by the endorsed payment order sent to the administrative section of the service X. Activities such as receiving and sending the payment order (6) on the one hand and recording bookkeeping situations (7) on the other are performed in parallel.

Such a procedure can be physically embodied with the aid of software for creating an information control network (ICN), making it possible to produce a graph, as will be seen hereinafter.

Based on this graph and on the information input by the user, the system will constitute the static data tables ORGA-ACTOR, ORGA-ROLE, ORGA-R-OFF-ACT, JDV-PD-DEF, which will allow the various elements of the system, beginning with the scheduler, for example, and other modules to constitute the information in static tables, such as SCHED-PROCEDURES, SCHED-ACTIVITIES, SCHED-PRECEDENCES, and the dynamic tables SCHED-JOBS, SCHED-STATEP, SCHED-STATUSP, SCHED-TASKP, JDV-JDV, ADV-ADV, which allow the various elements of the modules to communicate with one another and to exchange the information necessary to execute tasks, as has been explained in the related applications mentioned above.

The software for defining and representing the procedures and activities may either be loaded at the level of the workstation 1 in the interface administrator, or may be available at the level of the administrator 32 of the server station 3.

This software cooperates with a mouse or any other means enabling the activation of certain zones of the screen of the terminal or of the server following external events produced, in the case of the mouse, for example, by the action of the left-hand button, which makes it possible to designate the current command in order to select a menu or position a figure, for example, and in the case of the right-hand button to cancel the current command.

The external events originating in the mouse or in any other hardware are a process by a preprogrammed interface capable of recognizing such events, as well as logical events such as the entry of the mouse pointer into the window.

Moreover, supplementing the mouse interface, a keyboard interface may also be provided, programmed both for the character keys and for the control and pointer keys.

Figure 1:
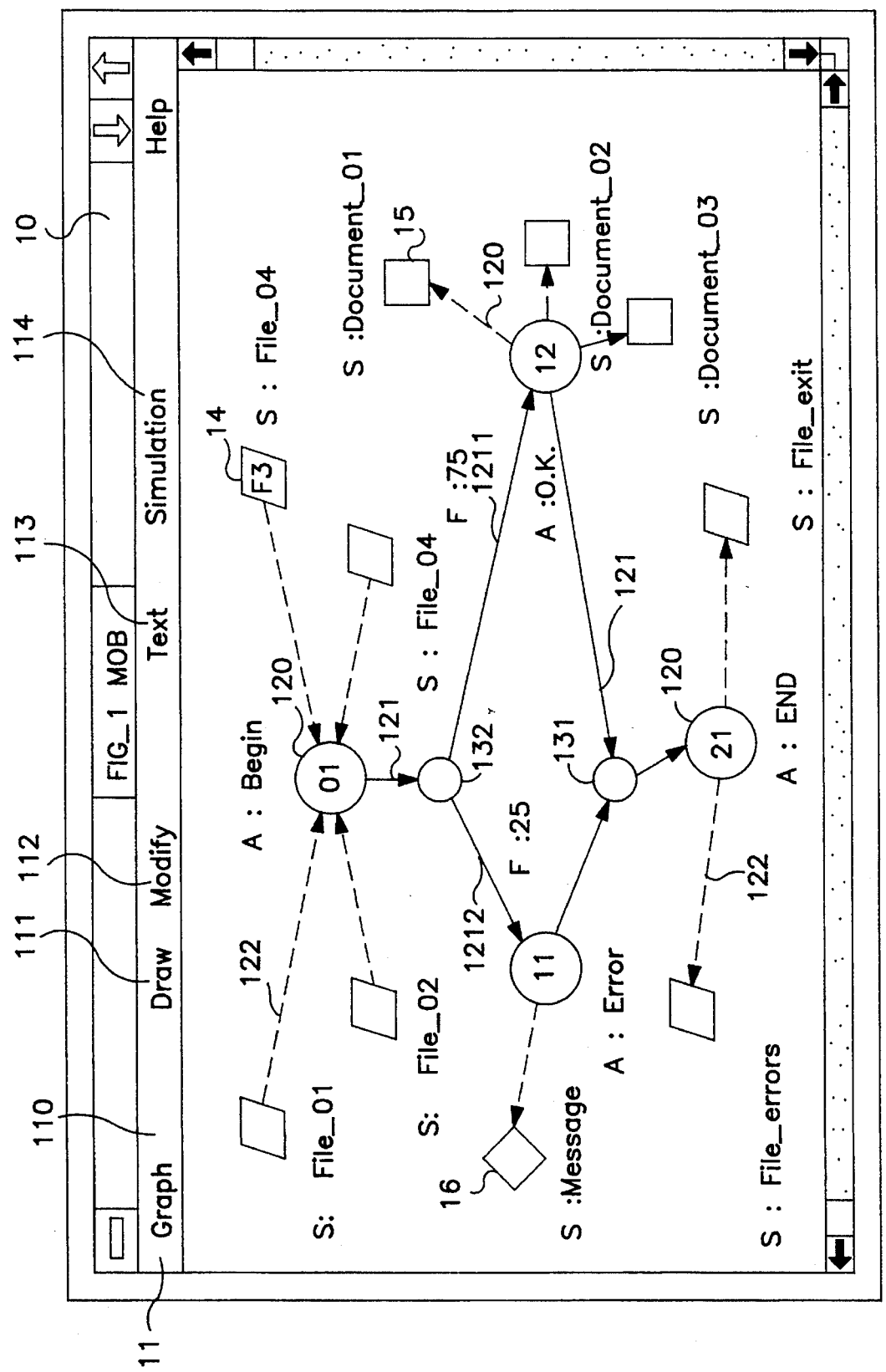
FIG. 1 is a view of the information displayed on a screen of a workstation using the system for designing information control networks according to the invention.

The graphical representation software of the information control network of the ICN type makes it possible to represent graphs such as those of FIG. 1, which constitute representations of procedures.

Figure 3:
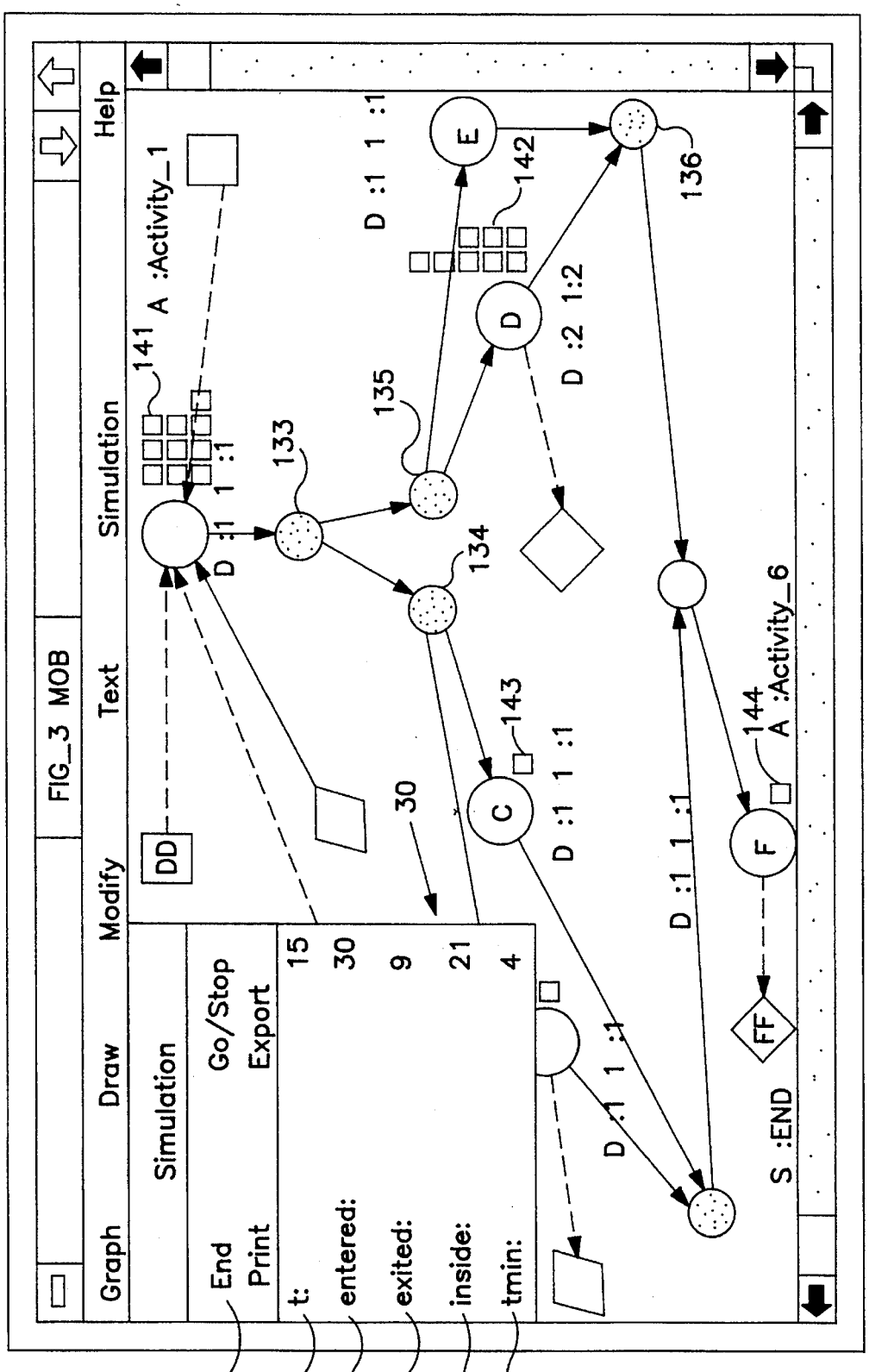
FIG. 3 is a view of the screen of the station when the user runs a simulation of the process.

In the graph of FIG. 1, accordingly, various activities represented by circles of larger diameter and numbered 01, 11, 12, 21 are connected to one another by arrows drawn in solid lines, either directly in the case of 121, or in the case of 1211, 1212, 1213 by way of a jump 131, 132, which may be either an AND-WELL jump such as 136 shown in FIG. 3 or an AND-SOURCE jump 133, 134, 135 in FIG. 3, in the case where the circles representing the jumps are in color represented by shading, and in the case where the circles are empty, either an OR-SOURCE jump (132 in FIG. 1) or an OR-WELL jump (131, FIG.).

An activity preceding an AND-SOURCE jump must be terminated so that one or all of the following activities can begin. Similarly, all the activities preceding an AND-WELL jump must be completed in order to be able to continue the procedure. The OR-WELL jumps indicate that the arbitrary one of the preceding activities has been completed, to allow the procedure to continue. The relative frequencies of execution may be indicated on the graph following the indicator F, as represented for the arrows 1212, 1211 of FIG. 1 connecting the OR-WELL jump 132 to the respective activity (11, 12). The arrow 1212 has a frequency of execution of 25. The elementary activities are also connected by dashed arrows (122) and are oriented with the aid of an arrowhead pointing toward the activity if the activities receive the information and pointing in the opposite direction if the activity transmits the information to receptacles which enable the storage of information, whose type is differentiated by how it is shown. Hence a receptacle in parallelogram 14 form represents a file, a square 15 represents a document, and a diamond 16 represents a message.

In activity A in FIG. 3 preceding an AND-SOURCE jump (133) must be terminated in order for one or all of the activities following this AND to be able to begin. Similarly, all the activities D, E preceding an AND-WELL jump 136 must be completed to enable continuing the procedure.

When it is started, the software makes a window appear that includes the menu bar 11 in FIG. 1, which enables the selection of one function among the functions presented on the menu, by putting the marker of the mouse on the function to be selected and clicking the left-hand button.

For each function (110–114), this causes a listing box to appear that shows the commands (FIG. 2) of the function selected. The "graph" function includes the following commands: "OPEN", which enables the reading and display of a graph already stored in memory; "RECORD", which enables the storage of a graph in memory on disk, diskette or tape cassette; "PRINT", which permits printing of a graph of paper; "EXPORT" which enables the constitution of a file suitable for a given type of software, such as the drawing software sold commercially under the tradename "DRAW"; "REPAINT", which enables the correct redisplay of the graph on the screen such that all the data have actually been defined following modifications; "NEW", which enables the initialization of a new graph by clearing the screen.

Figure 2:
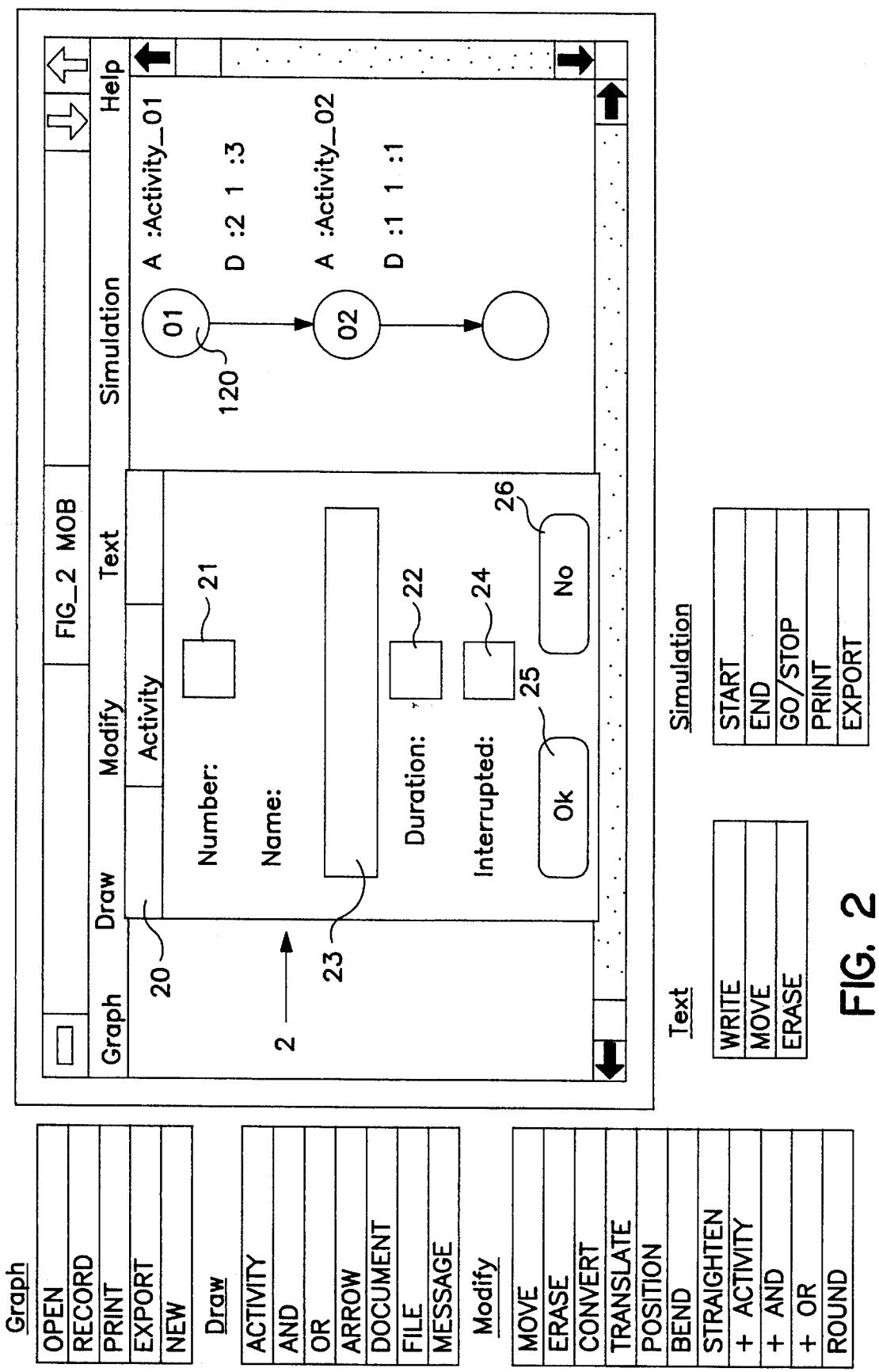
FIG. 2 is a view of the screen of the station when the user wishes to specify the activities.

The "draw" function 111 makes it possible to call up the commands shown in FIG. 2, which serve to create and draw the various figures or objects composing a graph. Hence the "ACTIVITY" command starts a routine that enables the drawing of activities belonging to the graph after the cursor has been positioned on the activity box and after execution has been tripped by pressing on the left-hand button of the mouse to make the command operative.

A circle (120, FIG. 1) representing an activity is positioned by the cursor arrow of the mouse, and its definition position is fixed by clicking on it with the left-hand button of the mouse. To document the activities, it suffices to start the "TEXT" function and the "WRITE" command, where a circle represents an activity after it has been selected by moving the pointer arrow to it and clicking on it with the left-hand button.

This "TEXT" function associated with the "WRITE" command for an activity causes a dialog box 2 to appear, shown in FIG. 2, in which a title bar 20 specified that it pertains to an activity, a writing box 21 enables retrieval of the activity number, a second writing box 23 enables the activity name, a third box 22 enables retrieving the duration of the activity, and a fourth box 24 enables retrieval of the interval.

Two command buttons, a first validation button 25 and a second cancellation button 26, make it possible to validate or invalidate the information that has been retrieved in the writing mode by using the keyboard. This also makes it possible for each activity 120 to document that activity, as shown in FIG. 2.

The "AND" command of the "draw" function in FIG. 2 enables starting a routine that assures the drawing of a graphical symbol representing an AND, which may be a WELL or a SOURCE.

The "OR" command of the "draw" function makes it possible to start a routine that assures the drawing of a graphical symbol representing an OR.

The way to proceed to draw the ORs and the ANDs is identical; it suffices to position the cursor of the mouse on the AND command or the OR command as applicable, and to click on it with the mouse decision button. By then moving the cursor arrow to the desired region on the window containing the activities of the graph, it then suffices to click to obtain an "AND" at the location which has been indicated by the cursor arrow.

Selecting the "ARROW" command of the "draw" function makes it possible to start the corresponding routine, that is, drawing of the arrows that will connect the activities to one another and will connect the activities to the receptacle. To do so, the user must click the decision button, once on the original figure and a second time on the destination figure. Depending on the nature of the figures that are connected, the arrow will be in solid lines for connections between two activities or in dashed lines for connection between an activity and a receptacle. An arrow in the course of being constructed, whose destination is not yet defined, will be cancelled by clicking on it with the right-hand button of the mouse. The user can bend an arrow directly by tracing it; all he has to do to do so is to click on the region where he wants to have an angle.

The number of the arrow entering or leaving an AND element or an OR element will indicate that the first ones are of the SOURCE type, while the second ones are of the WELL type.

Using the "WRITE" command of the "text" function makes it possible to introduce the relative frequencies in terms of percentage in each control flow after an OR-SOURCE jump.

In order to fix the frequency of passage between the two sides of an alternative determined by an OR, it suffices to click on either of the two arrows originating in the figure schematically representing the OR, for example the arrow 1211 of FIG. 1, which then, after the commands "TEXT" and then "WRITE" have been clicked on causes a dialog box to appear, with a single field to be keyed in, which is constituted by the frequency in percentage of the frequency of passage on this arrow.

A command button OK causes the dialog box to disappear, and the frequency keyed in at the keyboard is displayed next to the arrow when this OK button is clicked.

The "DOCUMENT" document of the "draw" function, after its selection, enables the starting of a routine that assures the representation of a receptacle of the document type. Placing receptacles on the screen is done in the same way as for activities.

Selecting the "FILE" command of the "draw" function enables the starting of a routine that assures the representation of a receptacle of the file type, and its positioning at the end of the cursor arrow. Putting the files in place is done in the same as for the activities.

Selecting the "MESSAGE" command of the "draw" function enables the starting of a routine that assures the representation of a message-type receptacle, and its placement is done as for the activities.

Selecting the "write text" menu makes it possible to introduce the information about the receptacles, that is, the names and numbers of the documents, file or message.

By clicking on a selected receptacle (for example 16 in FIG. 1), after having clicked on the "write text" functions, a dialog box is displayed superimposed on the graph, with the word "receptacle" as a header. This dialog box, as for the activity, shows a set of fields with which the name and number of the receptacle can be indicated. When the keying in is validated by clicking on the OK box, the dialog box disappears, and the information appears on the graph, causing the number to appear inside the figure that schematically represents the receptacle, and causing the name to appear next to the figure schematically representing the receptacle. Hence the receptacle 14 carries the number F3 and the file name 03.

The "MOVE" command of the "text" function makes it possible to move the information that has been brought up relating to the activities, receptacles or arrows. To move a text element, first this element must be clicked on in order to designate it, or the figure to which this text is attached must be clicked on, and a black rectangle appears superimposed on this text. It is this rectangle that the user can then, by suitably moving the mouse, move to the new location where the user wants the text to appear.

To validate the move if desired, it suffices to click with the left-hand mouse button in order to see the text displayed in its new position. Conversely, if rescinding the move is desired, then by clicking on the right-hand mouse button the move is cancelled and the text automatically returns to its initial position.

The "ERASE" command of the "text" function enables cancelling the information that has been made to appear relating to the activities, receptacles or arrows.

All the names of activities or receptacles can be erased from the graph by clicking thereon, and all the interval durations can be erased from the graph simultaneously by clicking thereon.

The frequencies relating to arrows may be erased by clicking on top as well. Hence for a graph, it is necessary to click successively on each branch, or to use the "retouch graph" function.

To erase or modify the numbers that are associated with the activities or receptacles, the write command must be used, which makes it possible to work from the dialog box.

The menu bar 11 also includes a "modify" function 112, which when it is selected by a click on the left-hand mouse button, causes a succession of commands to appear: "move", "erase", "convert", "translate", "position", "bend", "straighten", "+ activity", "+ AND", "+ OR", "– round".

The "move" command enables moving a figure, including activities or receptacles, along with the arrows and texts associated with them. To do this, the figure to be moved must first be designated with a click of the mouse, after "MOVE" has been selected. In this case, the figure is erased to leave room for a small black square which is moved with the mouse. The arrows are replaced by elastic straight-line segments that move at the same time as the cursor. This command makes it possible to reposition the figure, arrow, or text set. Once the move is validated with the mouse, the figure redraws itself and all the arrows that touch it fix themselves. Conversely, if one wishes to delete the modifications, a click on the right-hand button of the mouse cancels and automatically repositions the figure to its original location.

The "ERASE" command, after its selection, enables the erasure of a figure designated by a mouse click on the figure. The erasure is done with the arrows and texts that are attached to the figure. The receptacles, conversely, must be destroyed separately. As for the arrows, they can be erased by clicking on the arrow desired.

The "convert" command, when it is selected, makes it possible to convert a receptacle of a certain type (document, file or message) into a receptacle of another type. This conversion is done on the figure to be modified, which is designated by the cursor arrow of the mouse and be clicking with the left-hand button. The conversion is done by the following logical rules: a single click converts a document into a file, a file into a message, or a message into a document. In this way, three successive clicks restore the original receptacle.

The "TRANSLATE" command makes it possible to start a routine that will assure vertically moving of the entire portion of the graph located below a horizontal line, without breaking the existing links. The manipulation consists of selecting a figure with a mouse click, which causes a horizontal line serving as a reference to appear. Moving the cursor arrow will indicate the position where the figure will be located once a second mouse click has been made. Before this second click is done, the command can be cancelled by pressing on the right-hand button of the mouse. This command performs global moving of all the objects located below the line, including the receptacles and the texts, and makes it possible to expand or shrink a graph in height.

The "POSITION" command makes it possible to trip the execution of a routine that will assure moving the entire graph, by translating it arbitrarily in the two dimensions of the screen, moreover without deforming it in order to position it. To do this, the cursor is positioned on any arbitrary figure of the graph, and then after clicking with the left-hand button of the mouse, the user moves the cross-hairs that have just appeared, made up of two perpendicular lines, by moving the mouse to the desired position. A second click fixes the region where the entire figure will be positioned.

The "BEND" command makes it possible to start a routine that assures the bending of an arrow or modification of the location of the bend. To do this, it suffices to designate the arrow selected with the cursor and then to click on top of the region where the bend is desired, which causes an elastic bent segment to appear that is moved by means of the mouse. A second click makes it possible to fix the shape of the arrow. In the course of moving, it is always possible to cancel the command with a click on the right-hand button of the mouse.

The "STRAIGHTEN" command makes it possible to start a routine that assures straightening of a bent arrow. To this, it suffices to designate the selected arrow with the cursor, and click on top with the decision button, which causes the bent arrow to become a rectilinear arrow again.

The "+ ACTIVITY" command makes it possible to start a routine that assures the introduction of a supplementary activity along the route of an existing arrow. To do this, the user designates the existing arrow with the cursor arrow, then clicks the left-hand button of the mouse, causing a new activity to appear on this arrow. The figure created moves roughly to the middle of the arrow if the arrow is straight, or to the bend if the arrow is bent.

The "+ AND" command makes it possible to start a routine assuring the introduction of a supplementary AND along the route of an existing arrow. Similarly, the "+ OR" command makes it possible to start a routine assuring the introduction of a supplementary OR along the route of an existing arrow.

Both these commands function by the same principle as the "ACTIVITY" command, and it suffices to use the mouse to click on the arrow to which an AND or OR is to be added.

The "– ROUND" command makes it possible to start a routine that assures the withdrawal of an activity, and an OR or an AND of the graph and to reconstruct an arrow. To do this, by clicking with the left-hand button of the mouse, the user designates an activity, which is necessarily located along the path of an arrow. This operation causes the elimination of the activity and reconstruction of the single arrow. The operation is done in the same way for an AND or an OR, except that such an operation cannot start when there are at least two entry or exit branches.

Finally, the menu bar includes a "simulation" function 114 that includes the "start", "end", "go/stop", "print" and "export" commands.

Before the simulation is started, it is appropriate to be assured that all the activities have been assigned values for duration and for the interval. These values are re-input with the aid of the "write text" function, as has been explained above. The duration constitutes the duration of the activity that will elapse during a simulation, and the interval represents the minimum time interval between two tokens processed successively by the same activity.

Hence it is possible for example to have a duration 5 and an interval 5, that is to say that the activity can process one token every five units of time, and it keeps it for five units in order to process it. It is also possible to have a duration 5 and an interval 1, for example, which signifies that the activity can process one token per unit of time and keeps this token for five units of time to process it. It is also possible for example to have a duration of 5 and an interval of 15, signifying that the activity can process only one token every 15 units and that it requires 5 units of time to process the activity.

As a conventional unit of time, the user will choose a period of time that enables him to express all these values with the same unit. As applicable, he can choose the day, the hour, the minute or even the second.

When the user clicks the simulation function with the mouse button, the program causes a dialog box 400 to appear on the screen, which enables the user to define a certain number of parameters appropriate for his problem and leads to the execution of a predetermined simulation. The first parameter to be fixed relates to the elementary unit of time that involved in the speed at which the simulation is to proceed under the eyes of the user. It suffices in FIG. 4 to click on one of the three buttons located opposite the three possible options, which are ½ second, 1 second or 2 seconds. This makes it possible to perform a simulation at a normal, accelerated, or slowed-down speed. The second parameter to be defined is the frequency of entry of the tokens, by filling a first field (44) representing the number of tokens and a second field (45) representing the number of the unit of time in the course of which the number of tokens is entered, an example being two tokens every three units of time. A third field (46), makes it possible to specify whether the tokens are sent one by one or by batch, and the size of the batch. Hence in this third field if the user has specified that the batch contains 15 tokens, and if he has previously requested five tokens per unit of time, then the system will present one batch every three units of time. Finally, a final field (47) makes it possible to define the maximum number of tokens for the simulation. In the example given, one is limited to 40 tokens, and the simulation lasts until these 40 tokens have entered and exited after traversing the graph.

It then suffices to click on the "start" command button (48) of the dialog box (40) to start the simulation. Conversely if the mouse cursor is placed on top of the "no" command button (49) and the left-hand mouse button is clicked, then the definition of the parameters is cancelled.

Figure 4:
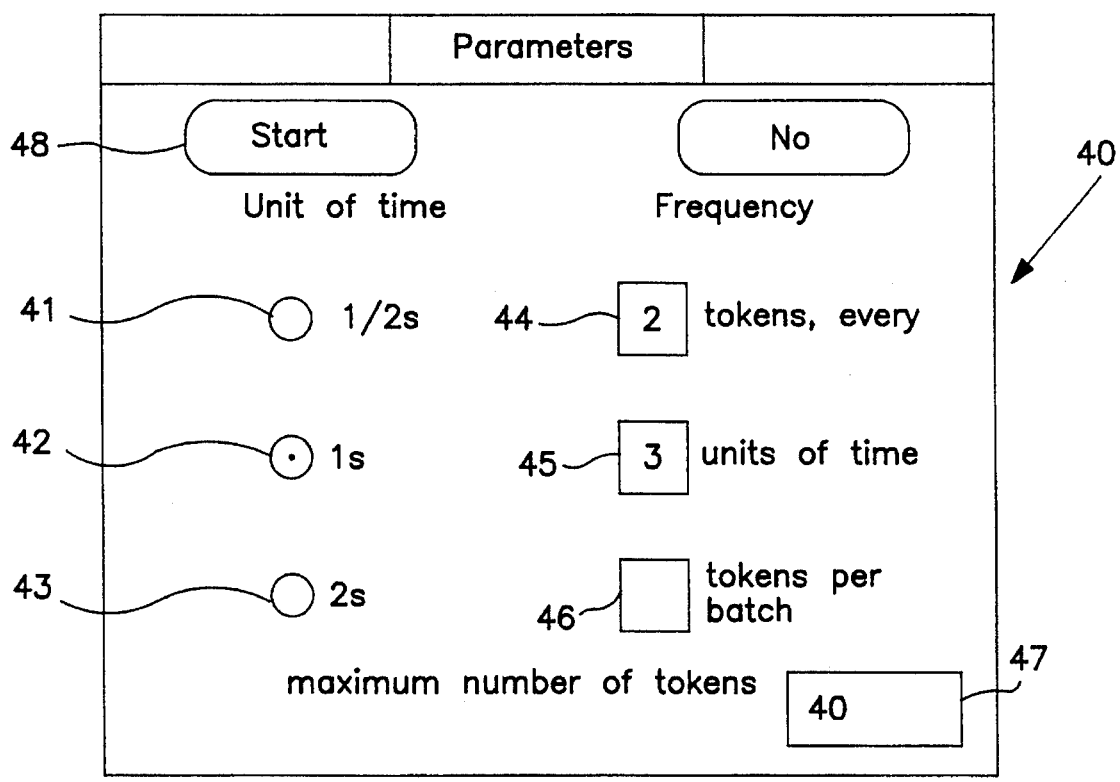
FIG. 4 shows the screen that enables introducing the parameters with a view to simulation.
Figure 5:
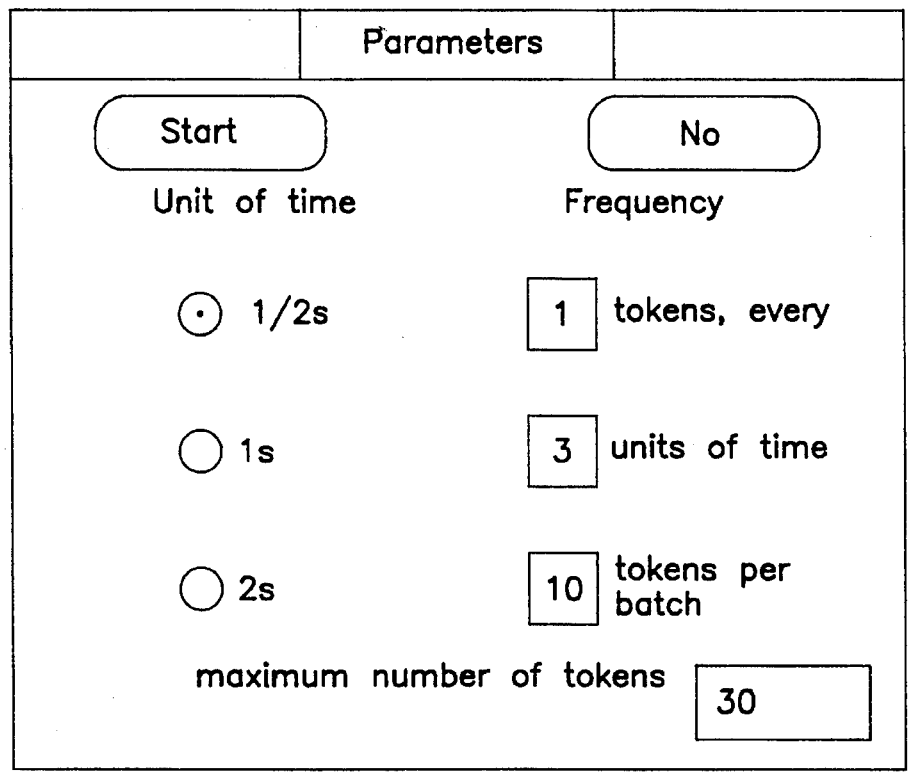
FIG. 5 is a second example of a parameter introduced with a view to a simulation.

Hence FIG. 4 shows a first example of parameters introduced with simulation, and FIG. 5 shows a second example of simulation parameters where tokens are sent batchwise.

As long as the simulation has not been started, it is always possible to modify its parameters by clicking on the corresponding fields to enter new values, or even to restart this simulation by clicking on the "no" box. By clicking on the "start" box (48) of the dialog box, the tokens begin to circulate in the procedure, and as soon as the simulation is started, a small window (30) in FIG. 3, titled "simulation", appears and permanently, dynamically displays a certain number of pieces of information, which are: in a first field (31), the time (T) elapsed in units of time; in a second field, "entry" (32), the number of tokens that have entered; in a third field, "exit" (33), the number of tokens that have exited; in a fourth field "inside" (34), the number of tokens in a procedure; and in a fifth field (35), the minimum time "tmin" required to go through the procedure.

As a supplement to the above data, the simulation window (30) simultaneously, in a zone 36, displays a set of four commands that enable the best use of the results of the simulation.

These four commands are "end", "go/stop", "print", and "export".

When the simulation is in progress, the selection of the "go/stop" command by a mouse click makes it possible to interrupt this simulation temporarily and to freeze the graph with the tokens where they are located at the given instant of clicking, as represented in FIG. 3 by reference numerals 141, 142, 143, 144. A second click on this command restarts the simulation.

Selecting the "print" command after having first stopped the simulation with the "go/stop" command makes it possible to recover and send to a printer the entire graph frozen with its tokens and with the information displayed in the window.

It is also possible to export the graph by selecting the "export" command in the window.

Figure 6:
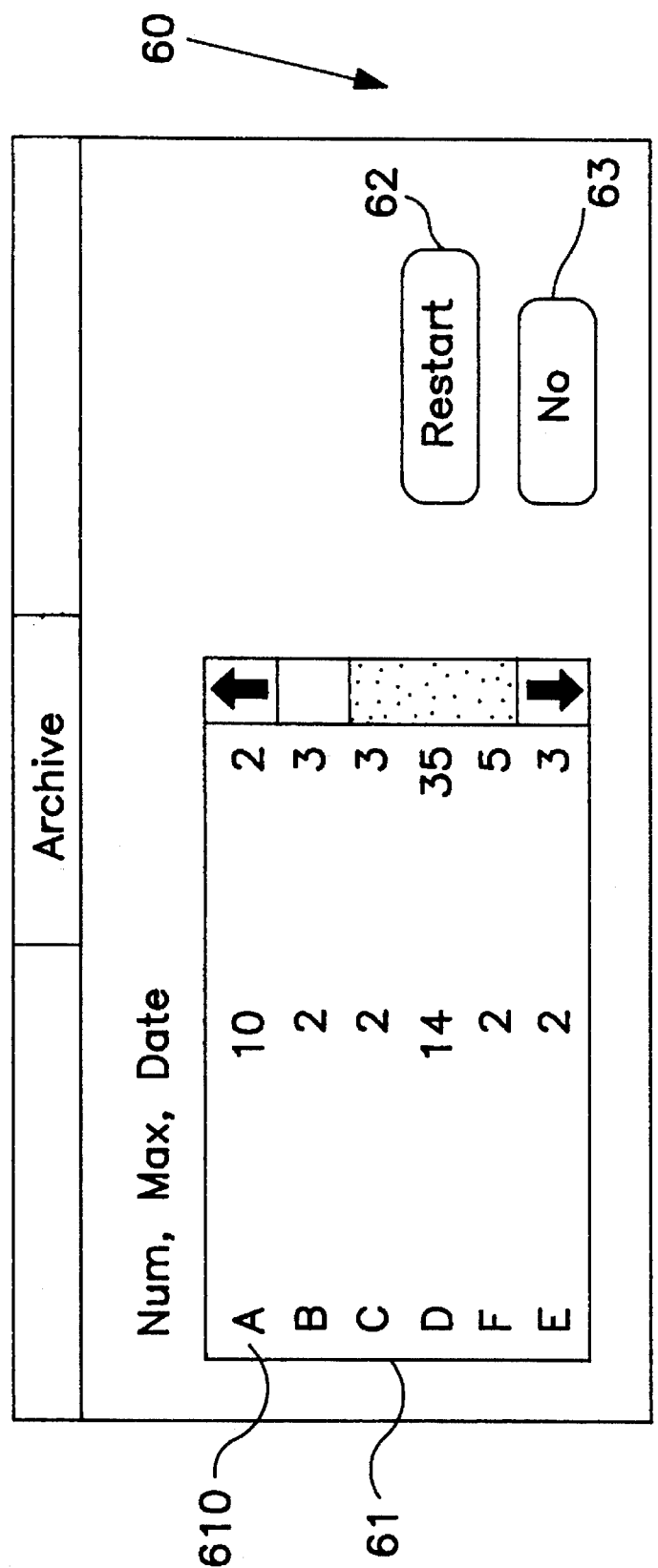
FIG. 6 shows the display of the archive on the screen of the workstation.

In order to completely stop the simulation at any moment of its execution whatever, it suffices to select the "end" command, which causes the display of an archive in a window, as shown in FIG. 6.

If the simulation is stopped naturally by the circulation in the graph of the maximum number of tokens defined in the parameters, then it is nevertheless necessary to click on the "end" command to display the archive before being able to return to the main menu.

The "archive" window (60) displays the information for all the activities of the graph in a listing box (61). Each line (610) is dedicated to only a single activity and furnishes the following, in this order: the number of the activity, the maximum number of tokens that have accumulated in the queue for that activity during the simulation, and the moment calculated in units of time since the start when this maximum accumulation occurs. Hence for the starting activity A, the maximum number of tokens was 10, and the moment was the second unit of time. The listing box (61) includes a vertical elevator (611) enabling the display of other activities. The archive window also includes a "restart" command button (62) and a "no" command button (63), which in the case where the "no" button is clicked enabled a return to the menu in order to work on the graph again, in order to improve it or modify it before starting a new simulation.

If the best possible use of all the information furnished during the simulation has not been made, then it is possible to restart it in the identical fashion, with the same parameters, by clicking on the "restart" box (62).

When greater precision is desired in a simulation relating to a given activity, it is possible to select this activity by clicking on the corresponding line in the archive window, such as line 610.

By then clicking on the restart box, the simulation runs normally beginning at the beginning, but is interrupted at the time indicated, corresponding to the maximum number of tokens for the activity chosen. This makes it possible to obtain a complete situation at the moment of a maximum and to print it if necessary in order to see what modifications can be made to the procedure.

It is also possible to request that the new simulation be stopped several times, by selecting several lines in the list. This is done by performing a "shift" click, that is, mouse clicks with the "shift" and the key on the keyboard depressed. Hence, the user, by using the means described above, can define the procedures and activities and can thus constitute the information of the static tables ORGA-ACTOR, ORGA-ROLES, ORGA-R-OFF-ACT, and JDV-PD-DEF.

Further modifications within the competence of one skilled in the art may also be made within the spirit of the invention.

APPENDIX 1

1. Recording a project
   actor: administrative section of service X
   information arrived: project
   from: candidate (=external receptacle)
   information departed: recordation number
   where: receptacle A (=permanent internal)
2. Approval
   actor: decision committee
   information arrived: project, recordation number
   from: receptacle A
   information departed:
     hiring proposal
     unsigned draft contract
   where: mail from service X administrative section
3. Reception and distribution
   actor: administrative section of service X
   information arrived:
     hiring proposal
     unsigned draft contract
   from: mail sector X
   information departed: same
   where: mail from responsible person in the sector
4. Endorsement
   actor: responsible person of the sector
   information arrived:
     hiring proposal
     unsigned draft contract
   from: staff mail
   information departed: endorsement of these elements
   where: mail administrative section Y
5. Photocopying and sending
   actor: administrative section of service Y
   information arrived: endorsement of the hiring proposal and draft contract
   from: mail sector Y
   information departed: elements photocopied
   where: bookkeeping mail
6. Receiving and sending payment order
   actor: bookkeeping
   information arrived: photocopy of the file
   from: bookkeeping mail
   information departed: endorsed payment order
   where: mail administrative section of service X
7. Recording bookkeeping situations
   actor: administrative section of service X information arrived: listings from: bookkeeping information departed: recordation number where: classification of the administrative section of service X=receptacle A, permanent internal Activities 6 and 7 are performed in parallel (and the various activities that follow them must be done before being able to proceed with the rest of the procedure). We will then have to add the symbols "AND-SOURCE" and "AND-WELL". The "AND-SOURCE" will be replaced between activities 5 and 6 and 5 and 7.

8. Return to the administrative section actor: administrative section of service X information arrived: payment order signed, bookkeeping situation, project from: bookkeeping, receptacle A information departed: payment order signed, bookkeeping situation, project where: mail from the responsible person in the sector The "and-well" will be placed here 9. Checking actor: responsible sector information arrived:
payment order
bookkeeping situation, project from: administrative section X information departed: checking of the final contract where: bookkeeping, receptacle A 10. Endorsement of payment orders actor: responsible sector information arrived:

from:

information departed: endorsed payment orders where: bookkeeping candidate

What is claimed is:

1. A system for designing information control networks for modeling a process, including means for defining a set of independent procedures, said independent procedures comprising objects, including activities to be performed, AND-SOURCE or OR-SOURCE jumps, or AND-WELL or OR-WELL jumps, which together define the process to be modeled, means for representing each object as a different graphical symbol, means for assigning textual attributes and other information to the graphical symbols, means for representing the information as receptacles indicating a file, document or message, each receptacle having a different shade based on the information contained therein, means for defining logical links between the objects, and for defining logical links between the objects and the other information to define a process model in the form of a graph, said graph connecting activities by arrows drawn in a solid line, either directly or by way of a jump, wherein activities are also connected by dashed arrows to the information, and means for interactively manipulating the objects, attributes, information and links on a graphical screen of the information processing device.

2. The system of claim 1, wherein said AND-SOURCE and OR-SOURCE jumps enable at least two activities to begin, and said AND-WELL and OR-WELL jumps enable at least two activities to end.

3. The system of claim 2, wherein the attributes include a name of an actor that is to perform an activity, a name of the activity, a name of the type or of the storage location of information needed to perform the activity a mean frequency of use of the object for use when there is a choice to be made between a plurality of activities, a production period (22) corresponding to each activity, and a time period (24) representing the minimum time interval that must elapse between two successive occurrences of the same activity.

4. The system of claim 2, wherein an AND-SOURCE jump is operable to start two activities in parallel when an activity preceding the AND-SOURCE is terminated.

5. The system of claim 2, wherein an AND-WELL jump is operable to wait until all activities preceding the AND-WELL have been completed before beginning a next activity.

6. The system of claim 2, wherein an OR-SOURCE jump is operable to selectively start one of two possible activities.

7. The system of claim 2, wherein an OR-WELL jump is operable to start a next activity, if any of two previous parallel activities have been completed.

8. The system of claim 1, wherein the receptacles are differentiated, and further including means for displaying a receptacle indicating a message (16) as a diamond configuration.

9. The system of claim 1, wherein the receptacles are differentiated, and further including means for displaying a receptacle indicating a file (14) as a parallelogram configuration.

10. The system of claim 1, wherein the receptacles are differentiated, and further including means for displaying a receptacle indicating a document (15) as a square configuration.

11. The system of claim 1, wherein the means for manipulating includes the following functions: "draw" to draw a graph, "modify" to change the graph, and "text" to enter the information and the textual attributes.

12. The system of claim 11, wherein the "modify" function includes:

a "bend" function to bend an existing link, a "straighten" function for straightening an existing link, a "+ activity" function for adding an additional object into the path of an existing link, a "+ AND" function to add an AND to the path of an existing link, a "+ OR" function to add an OR to the path of an existing link, and a "− round" function for deleting an object, an OR, or an AND, and to reconstruct a link.

13. The system of claim 12, wherein the "draw" function includes the following commands:

"activity" for enabling the drawing of an activity; "AND" for drawing a graphical symbol representing an "AND" "OR" for drawing a graphical symbol representing an "OR", "ARROW" to draw the links;

"document" to display a document receptacle upon entering or leaving an activity;

"file" to display a file receptacle upon entering or leaving an activity;

"message" to display a message receptacle upon entering or leaving an activity; and "WRITE text" for enabling entry of the information and attributes.

14. The system of claim 11, wherein the "draw" function includes the following commands:

"activity" for enabling the drawing of an activity; "AND" for drawing a graphical symbol representing an "AND", "OR" for drawing a graphical symbol representing an "OR", "ARROW" to draw the links;

"document" to display a document receptacle upon entering or leaving an activity;

"file" to display a file receptacle upon entering or leaving an activity;

"message" to display a message receptacle upon entering or leaving an activity; and "WRITE text" for enabling entry of the information and attributes.

15. The system of claim 14, wherein the commands "activity", "AND", "OR", "ARROW", "file", "message", and "WRITE text" enable the creation of ORGA-ACTOR, ORGA-ROLE, ORGA-R-OFF-ACT, and JDV-PDDEF tables in a system for transactional processing between an information server and at least one workstation, between which activities constituting the process are executed, wherein said system for transactional processing includes a server side which comprises a scheduler module for scheduling tasks and jobs associated with the activities, a dispatcher module for performing distribution of the tasks, a signaler module for preserving a log of timed events and receiving information from the scheduler module and from a coordinator module, a message box for exchanging signals with the dispatcher module and signaler module and with a communication module for communication with said at least one workstation and a data management module for managing data, and further wherein the transactional processing system includes a workstation side which comprises a communication layer, a layer for management of messages corresponding to a work flow, an interface layer including application programming interfaces, a management services layer and a user interface layer.

16. The system of claim 1, further including simulation means for executing a simulation of the process.

17. The system of claim 16, wherein the simulation means includes a "simulation" function, having a START command which begins the simulation after the determination of parameters.

18. The system of claim 17, wherein the "START" command enables the setting of the following parameters:

an elementary unit of time for use in the simulation;

a frequency of entry of tokens which represent activities to be performed in the simulation, and a third parameter which indicates whether a plurality of tokens or a single token will be entered into the simulation.

19. The system of claim 16, wherein the simulation means includes a "simulation" function, having an "end" command which stops the simulation in progress and calls up an archive function.

20. The system of claim 17, wherein the "START" command enables the setting of a parameter which represents the maximum number of tokens used in the simulation.

21. The system of claim 16, wherein the simulation means includes a "simulation" function having a GO/STOP command which temporarily interrupts the simulation in order to display statistics on the simulation at the moment of interruption and enables the simulation to resume at a point where interrupted.

22. The system of claim 21, wherein the "GO/STOP" command enables display of the following parameters: time elapsed, number of tokens that have entered the simulation, number of tokens that have exited the simulation, number of tokens in the simulation, and minimum time required for a token to go through the simulation.

* * * * *

UNITED STATES PATENT AND TRADEMARK OFFICE
CERTIFICATE OF CORRECTION

PATENT NO. : 5,481,668
DATED : January 2, 1996
INVENTOR(S) : Michel MARCUS

It is certified that error appears in the above-indentified patent and that said Letters Patent is hereby corrected as shown below:

Col. 15, line 67, (Claim 3, line 4): The patent reads "activity a mean" and should read -- activity, a mean -- (comma missing).

Col. 16, lines 50 and 51 (Claim 13, lines 4 and 5): The patent reads "AND "OR" and should read -- "AND", "OR" -- (comma missing).

Signed and Sealed this

Fifteenth Day of October, 1996

Attest:

BRUCE LEHMAN

*Attesting Officer*   *Commissioner of Patents and Trademarks*